Figure 4:
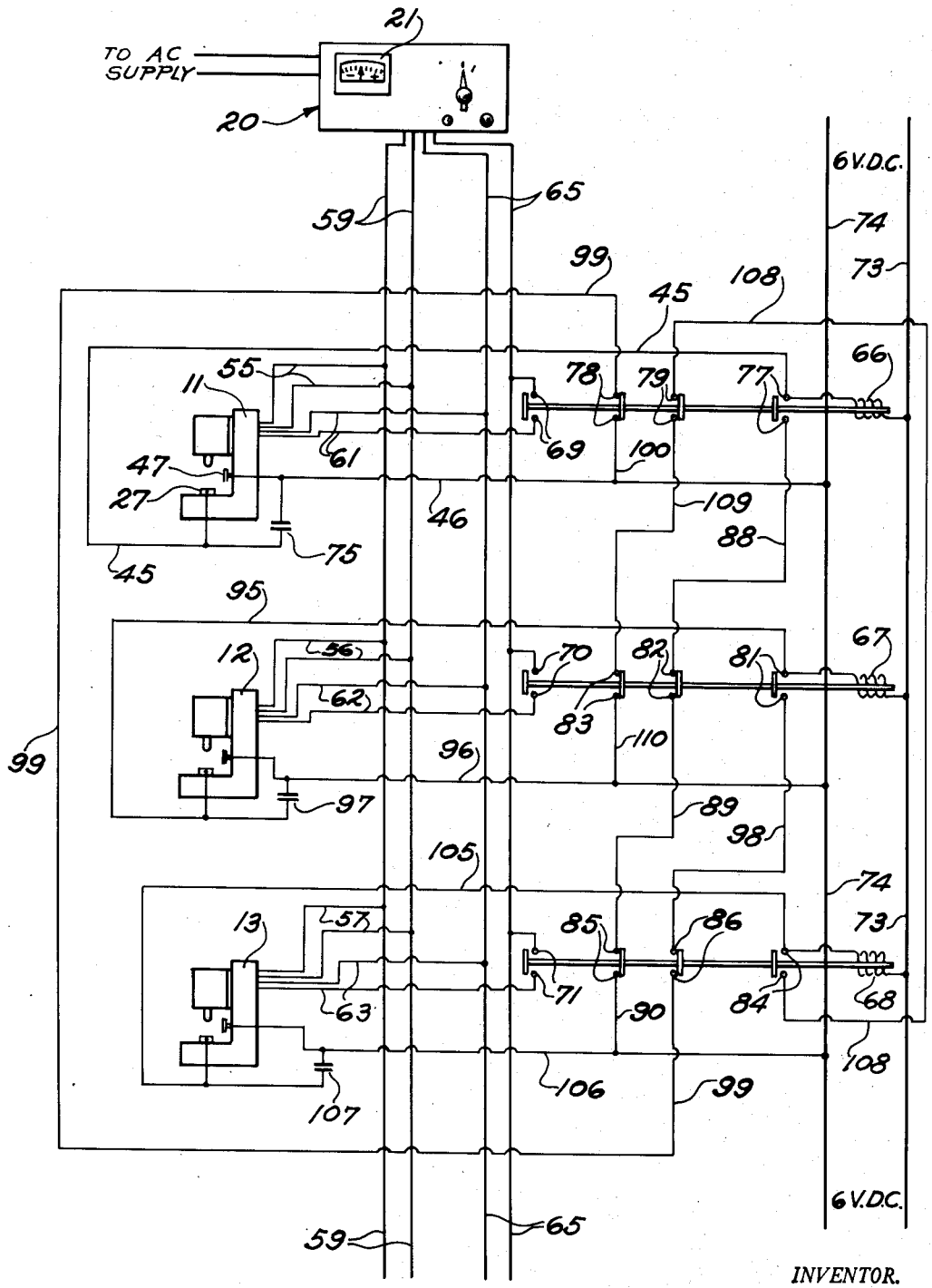

Sept. 13, 1955  E. W. GRAHAM  2,717,449
MULTIPLE GAUGING APPARATUS
Filed Jan. 14, 1952  2 Sheets-Sheet 1
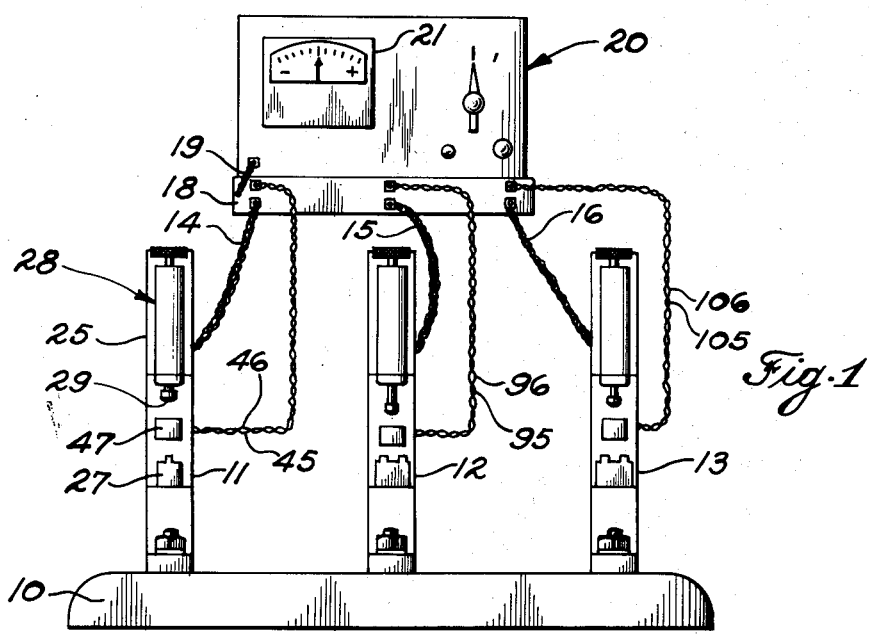
Fig. 1
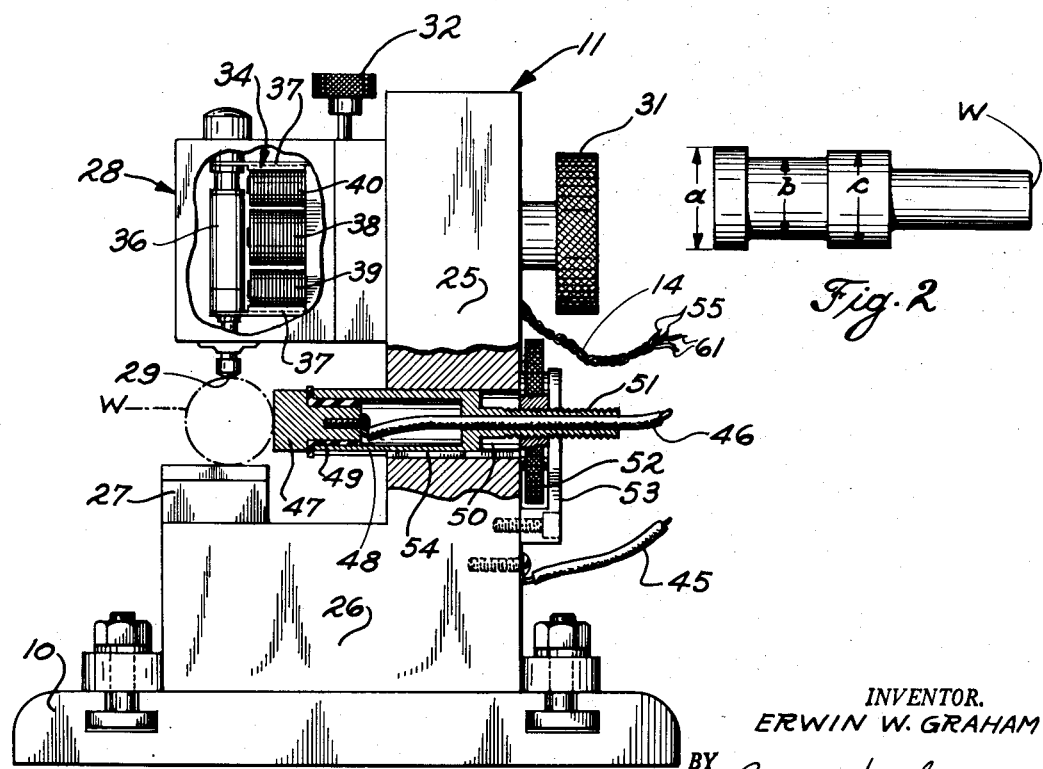
Fig. 2
Fig. 3
INVENTOR.
ERWIN W. GRAHAM
BY 
ATTORNEYS United States Patent Office 2,717,449
Patented Sept. 13, 1955

2,717,449

MULTIPLE GAUGING APPARATUS

Erwin W. Graham, Parma Heights, Ohio, assignor to Cleveland Instrument Company, a corporation of Ohio Application January 14, 1952, Serial No. 266,345

10 Claims. (Cl. 33—147)

This invention relates to measuring instruments and more particularly to electronic measuring instruments adapted to make successive measurements of different dimensions of workpieces.

Electronic micrometers or gauges are well known and widely used. In gauges of this type, the workpiece to be measured is engaged by a fixed anvil or the like and a movable gauging point or the like. The movable gauging point is connected with a movable element, such as an armature, of an electrical pickup, and through suitable electric circuits, the position of the gauging point with respect to the anvil is reflected in greatly amplified form on the dial of an electrical meter. It is the usual practice for these dials to have a zero position in the center; the pointer of the meter indicates the amount by which the dimension of the workpiece being measured is greater or lesser than a predetermined standard by movement in one direction or the other from the central zero. In practice, it is customary to set electronic gauges to zero for a given dimension with the aid of gauge blocks or a master gauge; in the gauging of workpieces the meters indicate deviations from the previously set dimension.

In production gauging, it is frequently desirable to check several different dimensions of each of a large number of substantially identical workpieces. It is, of course, possible to carry out such gauging operations by employing a separate gauge including a gauge proper, amplifier and indicating meter for each dimension to be measured, but for production gauging this is not satisfactory, not only because of the bulk and expense of providing a separate complete instrument for each dimension, but also because of the fact that it is difficult for the inspector in making a series of measurements rapidly to focus his eyes successively on a series of instrument dials.

According to the present invention the difficulties encountered in multiple gauging operations with separate gauging instruments are eliminated by providing an instrument which comprises a plurality of gauges adapted to measure a corresponding number of dimensions and providing means for connecting the output of the individual gauges with a single amplified and indicating meter. In the preferred form of the invention disclosed herein, the arrangement is such that the particular gauge which is being used to check a given dimension and in which the workpiece is disposed is automatically connected to the indicating meter when the workpiece is engaged by the gauge while all of the other gauges are automatically disconnected; preferably the connection of the meter with a given gauge is maintained until the workpiece is engaged by another gauge head even though the workpiece is removed from the first gauge head.

A general object of the present invention is to provide a measuring instrument adapted rapidly and accurately to make a series of different measurements on a given workpiece or succession of workpieces with the dimensions indicated by a single meter. Other objects of the invention are to provide such an instrument which is reliable in operation; to provide such an instrument which is substantially foolproof and requires no particular skill on the part of the operator. Further objects and advantages will be evident from the following description of a preferred form of the invention. The essential characteristics are summarized in the claims.

Referring now to the drawings, Figure 1 is a somewhat schematic view illustrating an instrument embodying a preferred form of my invention; Figure 2 illustrates a type of workpiece that can be measured rapidly and accurately with an instrument embodying my invention; Figure 3 is a side elevation, with parts broken away, illustrating the construction and arrangement of one of the gauges used in the instrument and Figure 4 is a wiring diagram showing preferred electrical circuits.

As shown in Figure 1, a preferred form of instrument embodying the present invention may comprise a supporting base 10 having gauges 11, 12 and 13 mounted thereon. The gauges 11, 12 and 13 are substantially identical except that they may be provided with different anvils or fixtures for properly positioning workpieces for accurate measurements of a given dimension. The gauges are connected by braided cables 14, 15 and 16 to the switch mechanism within the box 18 which is in turn connected by cable 19 to the amplifier indicated in general at 20; the amplifier is preferably constructed in accordance with United States Patent No. 2,508,370 issued May 23, 1950, in the name of Michael Bozoian. The output of the amplifier is applied to the zero center meter 21; the deflection of the needle of the meter to either side of the zero position indicates the amount by which a workpiece being measured by any of the gauges deviates from a predetermined standard.

An apparatus such as shown in Figure 1 is adapted to gauges, for example, workpieces such as the workpiece W shown in Figure 3 which has three dimensions to be checked. Gauge 11 is set up to check dimension $a$; gauge 12 dimension $b$, and gauge 13 dimension $c$. After the apparatus has been adjusted to the desired dimensions, the operator has only to position each workpiece successively in the three gauge heads and observe the dial 21 to determine whether the dimensions $a$, $b$ and $c$ conform to the standard with the desired degree of accuracy.

Gauges 11, 12 and 13 may be of any suitable form, a preferred gauge being illustrated in Figure 3. Gauge 11 is shown in this figure; gauges 12 and 13 are substantially identical in construction, so that the following description of gauge 11 can be taken to apply to them also. However, it is to be understood that the gauges need not be of identical construction so long as the several gauges will give accurate dimensional indications when successively connected to the same amplifier. Obviously, for some types of workpieces, as for example where inside and outside dimensions must be measured, widely differing types of gauges will be required.

Gauge 11 preferably comprises an L-shaped frame having a vertically extending portion 25 and a horizontal base portion 26. The base portion 26 is secured to the base 10 of the instrument and supports the anvil 27. The vertically extending portion 25 carries the gauge head indicated in general at 28 and is provided with a gauging point 29 which is arranged to contact the workpiece W when it is positioned on the anvil 27. In order to provide for adjustment of the position of the gauge head with respect to the anvil so that the gauge may be adjusted for objects of different size, the gauge head is mounted for sliding vertical adjustment with respect to the leg 25 by any convenient means such as for example a conventional rack and pinion mechanism (not shown) controlled by the coarse adjustment knob 31. The fine adjustment of the position of the gauging point may be made through a differential screw mechanism or the like (not shown) controlled by the fine adjustment knob 32 and which adjusts the position of an electrical pickup 34 with respect to the frame of the gauge head 28.

Pickup 34 is preferably constructed and arranged as described in detail in my co-pending application Serial No. 785,315, filed November 12, 1947, now Patent No. 2,627,062, issued January 27, 1953. For the purpose of the present application, it will suffice to say that the pickup comprises a magnetic armature 36 to which the gauging point 29 is secured, the armature being supported for movement in directions parallel to its axis by spring members 37 and being disposed adjacent the center exciting or primary coil 38 and end pickup or secondary coils 39 and 40. The exciting coil is energized with 60 cycle A. C. With the armature in mid-position the voltages induced in the pickup coils 39 and 40 cancel each other and the output of the pickup is zero; as the armature is moved in one direction or the other from its center position, the voltage induced in one of the pickup coils is increased and the voltage induced in the other pickup coil is decreased. As a result the output of the pickup varies in phase depending on the direction of movement of the armature from zero position and increases in amplitude as the armature is displaced or with the displacement of the armature from zero position. The output of the pickup is amplified by amplifier 20 and indicated by meter 21, as mentioned above.

In order to connect each gauge head with the amplifier when a workpiece is disposed therein, the gauges are preferably constructed as shown in Figure 3 so that electrical circuits are completed through them whenever a conductive workpiece is disposed in gauging position. This is accomplished by connecting conductor 45 to the base 26 of the gauge and conductor 46 to the backstop 47 against which the workpiece W is disposed when it is in proper position for measurement. Thus, a circuit is completed by the workpiece itself between conductors 45 and 46; the completion of this circuit results, through the electrical circuits shown in Figure 4, in the connection of the given gauge to the amplifier and the disconnection of all other gauges therefrom.

The backstop 47 is mounted in an adjustable support 48, being insulated therefrom by a tubular insulator 49. Support 48 is carried in a recess 50 in the vertical leg 25 of the gauge and has a rearwardly extending threaded portion 51 which is engaged by a knurled adjusting nut 52. Adjusting nut 52 is disposed between the back of vertical leg 25 and bracket 53, and is thus restrained against axial movement. The backstop support 48 is prevented from rotation with respect to the leg 25 by means of a key 54 or the like; hence, rotation of the adjusting nut 52 results in axial movement of the backstop support and backstop so that the backstop can be adjusted accurately to the desired position for engagement with the workpiece.

The circuits whereby the gauges 11, 12 and 13 are successively connected to the amplifier 20 are shown in Figure 4. With pickups of the type briefly described herein the cables 14, 15 and 16 leading from the respective gauges are each made up of two pairs of conductors. Conductors 55, 56 and 57 of gauge heads 11, 12 and 13 respectively lead to the exciting coils of the pickups of the respective gauges and to the 60 cycle A. C. exciting current supply conductors 59. In the embodiment shown the exciting current is supplied to all three gauge heads whenever the amplifier 20 is turned on. Conductors 61, 62 and 63 carry the output of the pickup coils of the pickups of the gauge heads 11, 12 and 13 and are connected to conductors 65 leading to the amplifier 20 through relays 66, 67 and 68 which are associated with the gauges 11, 12 and 13, respectively. Normally open contacts 69 of relay 66 control the output of gauge 11, the output of the pickup 34 of gauge 11 being connected to the conductors 65 and hence to the amplifier 20 whenever the relay 66 is energized. Relays 67 and 68 have similar normally open contacts 70 and 71 which control the connection between the pickups of gauges 12 and 13 and conductors 65.

In order to provide for the energization of each of the relays whenever a workpiece is inserted into the corresponding gauge, the circuits are arranged so that the workpiece itself completes the circuit through the coil of the associated relay between the lines of a suitable control voltage supply such as the 6-volt D. C. supply lines 73 and 74. In the case of gauge head 11 and relay 66, this is accomplished by connecting one terminal of relay 66 to conductor 73 and the other terminal to conductor 45 which, as previously described, leads to the anvil 27 of gauge 11. Conductor 46, connected to the backstop 47 of gauge 11, completes the return circuit to supply conductor 74, a condenser 75 preferably being connected across conductors 45 and 46 to prevent sparking or the possibility of a shock to the operator due to the inductance of the coil of the relay when the circuit through the workpiece is broken. Thus, relay 66 is energized whenever a conductive workpiece is placed in contact with the anvil 27 and backstop 47 of gauge 11. This closes the normally open contacts 69 and connects the output of the pickup of gauge 11 to the amplifier, closes the normally open contacts 77 which control a holding circuit for relay 66 and opens normally closed contacts 78 and 79 which control holding circuits for the other relays 67 and 68, as will appear below.

Relays 67 and 68 are substantially identical with relay 66, relay 67 including normally open contacts 81 controlling its own holding circuit and normally closed contacts 82 and 83 controlling the holding circuits for relays 66 and 68. Relay 68 includes normally open contacts 84 for its own holding circuit and normally closed contacts 85 and 86 for the holding circuits of relays 66 and 67 respectively.

When a workpiece is inserted in gauge 11, relay 66 is energized, the contacts 69 are closed to connect the gauge 11 to the amplifier, the holding circuit contacts 77 for relay 66 are closed and holding circuit contacts 78 and 79 for relays 67 and 68 are open. Opening of contacts 78 and 79 will result in de-energization in relays 67 and 68 if either of them happen to be energized, so that they will take their normal position as shown in the drawing. Then, the closing of holding contacts 77 will complete a holding circuit for relay 66 through conductor 88, contacts 82 of relay 67, conductor 89, contacts 85 of relay 68, conductor 90 and then back to D. C. supply line 74. Thus, even though the workpiece is removed from contact with the anvil 27 or backstop 47 of gauge 11, the circuit through the coil of relay 66 is held, gauge 11 is connected to the amplifier and all other gauges are disconnected.

If the workpiece is then positioned in gauge 12, the circuit to the coil of relay 67 is completed through the workpiece and anvil and backstop of gauge 12 (which are in all material respects like those previously described with respect to gauge 11) and through conductors 95 and 96 which correspond to the conductors 45 and 46 leading to gauge 11, a condenser 97 being connected across these conductors. Completion of the circuit through the workpiece in gauge 12 and energization of the relay 67 results in closing the normally open contacts 70 and 81 and opening the normally closed contacts 82 and 83 of relay 67. Preferably, relays 66, 67 and 68 are arranged so that the normally closed contacts are opened before the normally open contacts are closed. Opening of contacts 82 of relay 67 breaks the holding circuit for relay 66 so that relay 66 drops out, the contacts 69 are opened and gauge 11 disconnected from amplifier 37. At the same time, holding circuit contacts 78 and 79 are closed and holding circuit contacts 77 of relay 66 are opened. Closing of contacts 70 of relay 67 connects the output of gauge 12 to the amplifier 20 and closing of contacts 81 completes the holding circuit for relay 67 through conductor 98, contacts 86 of relay 68, conductor 99, contacts 78 of relay 66 and conductors 100 and 46 to complete the circuit to conductor 74.

A similar action takes place when the workpiece is inserted in gauge 13. Relay 68 is then energized, the circuit being completed through conductors 105 and 106 leading to the anvil and backstop respectively of gauge 13, a condenser 107 preferably being connected across conductors 105 and 106. Energization of relay 68 results in opening contacts 85 and 86, thus opening the holding circuits of relays 66 and 67 so that if either one of them is energized it will be immediately de-energized. Energization of relay 68 also results in the closing of contacts 71 and 84. Closing of contacts 71 connects the output of gauge 13 to the amplifier and closing of contacts 84 completes a holding circuit for relay 68 through conductor 108, contacts 79 of relay 66, conductor 109, contacts 83 of relay 67 and conductors 110 and 96.

Thus, with this arrangement each gauge is connected to the amplifier when the workpiece is positioned in the gauge so that the dimension of the workpiece, or more accurately, its deviation from a predetermined standard dimension is indicated by the needle of the meter 21. The gauge remains connected to the amplifier regardless of the position of the workpiece until the workpiece is inserted in a different gauge, then that gauge is connected and the previously connected gauge is disconnected. The arrangement is such that only the gauge in which the workpiece has been last disposed is connected to the amplifier regardless of the order in which the workpiece is progressed from gauge to gauge. Because of the holding circuits, the connection of a given gauge with the amplifier remains even though the connection between the workpiece and the backstop or anvil may be broken. This is important because it prevents unwanted fluctuations of the needle of meter 21 as the workpiece is moved beneath the anvil during gauging operations.

It is to be noted that for accurate results with an apparatus of this type it is necessary that the pickups of the several gauges have substantially identical output for a given deflection from their zero position. This type of output can be obtained readily with pickups constructed according to my aforesaid application so that accurate measurements can be obtained with a plurality of gauges connected to a single amplifier. Furthermore, the amplifier circuits are stable and are unaffected by the switching of the connections between the several gauge heads.

From the foregoing description of a preferred form of my invention, it will be seen that I have provided a multiple gauging apparatus in which a plurality of different dimensions of a given workpiece can be checked rapidly and accurately with the operator being required to observe only one dial or meter. With my apparatus, it is possible to provide for gauging of a plurality of dimensions with a reduced investment for gauging apparatus because a single amplifier and meter may be employed in conjunction with a plurality of gauges. The use of a single amplifier and meter is also advantageous from the standpoint of compactness of the apparatus and ease of use by the operator. The apparatus is sturdy, reliable and substantially foolproof inasmuch as the required connections and disconnections of the gauge heads and the amplifier are made automatically when the workpieces are positioned in the respective gauges.

Those skilled in the art will appreciate that various changes and modifications can be made in the invention without departing from the spirit and scope thereof. For example, a greater or lesser number of gauge heads than the three shown may be employed. Pickups and amplifier different from those preferred herein may be utilized; for example, where extremely high sensitivity is required a gauging head of the type shown in my co-pending application, Serial No. 212,653, filed February 24, 1951, now Patent No. 2,627,119, issued February 3, 1953, is advantageous. Instead of completing the circuit directly through the workpiece, the workpiece can be made to actuate a microswitch or the like to complete the control circuit. Such a construction is useful where the workpieces are of non-conductive material. The apparatus can be duplicated and thus arranged so that the workpieces are inserted into two gauges at the same time, the two gauges being connected through separate switching mechanism to separate amplifiers, in which case six dimensions, for example, could be checked by three pairs of gauges, one gauge of each pair being connected to one switching mechanism and its associated amplifier, the other gauge of each pair being connected to the other switching mechanism and its associated amplifier. Other changes and adaptations of the invention may be evident to those skilled in the art. It is therefore to be understood that the invention is not limited to the preferred embodiment therein described and shown herein, the scope of the invention being defined by the appended claims.

I claim:

1. In a gauging apparatus, a plurality of separate gauges each embodying an anvil for supporting a workpiece to be gauged, a backstop for positioning the workpiece on the anvil, a gauging point and an electrical pickup the output of which varies with the position of said gauging point, a single amplifier and an indicating device connected to the amplifier and adapted to indicate a dimension of a workpiece engaged by a gauge connected to the amplifier, and electrical connections for connecting any given gauge head to said amplifier when a workpiece is engaged by said given gauge head and for disconnecting all other gauges from said amplifier, said connections including in association with each gauge a normally open control circuit which is automatically closed when a workpiece is positioned in engagement with the anvil and backstop of the gauge with which said control circuit is associated, and a relay energized when said control circuit is closed, said relay comprising normally open contacts controlling the circuit leading from the pickup of the gauge head to said amplifier, normally open contacts controlling a holding circuit to said relay and normally closed contacts controlling the holding the circuits of the relays associated with the other gauges.

2. In a gauging apparatus, a plurality of separate gauges each embodying an electrical pickup element, a single indicating device adapted to indicate a dimension of a workpiece engaged successively in said gauge heads, electrical connections for connecting any given gauge head to said indicating device when a workpiece is engaged by said gauge head and for disconnecting all other gauge heads from said indicating device, said connections including in association with each gauge head, a normally open circuit that is automatically closed when a workpiece is positioned for gauging in the gauge with which the circuit is associated, and a relay energized when said circuit is closed, said relay comprising normally open contacts controlling the circuit leading from the pickup of the gauge head to the indicating device, normally open contacts controlling a holding circuit to said relay and normally closed contacts controlling the holding circuits of the relays associated with the other gauge heads.

3. An apparatus according to claim 2 wherein the normally open circuit is completed by conduction through the workpiece itself.

4. In a gauging apparatus having a plurality of separate gauges each embodying an anvil for supporting a workpiece to be gauged, a backstop for positioning the workpiece on the anvil, a gauging point and an electrical pickup the output of which varies with the position of said gauging point, a single amplifier, an indicating device connected to the amplifier and adapted to indicate a dimension of a workpiece engaged by a gauge the pickup of which is connected to the amplifier, the improvement which comprises electrical connections for automatically connecting any given gauge to said amplifier when a workpiece is engaged by said given gauge and for disconnecting all other gauges from said amplifier, said connections including in association with each gauge a normally open circuit which is closed when a workpiece is positioned in engagement with the anvil and backstop of the gauge with which the circuit is associated, and a relay energized when said circuit is closed, said relay having contacts controlling the circuit leading from the pickup of the gauge to said amplifier.

5. In a gauging apparatus, a plurality of separate gauges each embodying an anvil for supporting a workpiece to be gauged, a backstop for positioning the workpiece on the anvil, a gauging point and an electrical pickup the output of which varies with the position of said gauging point, a single amplifier and an indicating device connected to the amplifier and adapted to indicate a dimension of a workpiece engaged by a gauge the pickup of which is connected to the amplifier, and electrical connections for automatically connecting any given gauge to said amplifier when a workpiece is engaged by said given gauge and for disconnecting all other gauges from said amplifier, said connections including in association with each gauge a normally open circuit which is closed when a workpiece is positioned in engagement with the anvil and backstop of the gauge with which the circuit is associated.

6. In a gauging apparatus, a plurality of separate gauges each embodying an anvil for supporting a workpiece to be gauged, a backstop for positioning the workpiece on the anvil and a gauging point, an indicating device adapted to indicate a dimension of a work-piece engaged by a gauge connected to said indicating device, and electrical connections for automatically connecting any given gauge to said indicating device when a workpiece is engaged by said given gauge and for disconnecting all other gauges from said indicating device, said connections including in association with each gauge a normally open circuit which is closed when a workpiece is positioned in engagement with the anvil and backstop of the gauge with which the circuit is associated.

7. In a gauging apparatus, a plurality of separate gauges each embodying an electrical pickup element, a single amplifier adapted to amplify the output of said pickup, an indicating device associated with the amplifier and adapted to indicate a dimension of a workpiece engaged successively by said gauges, and electrical connections controlled by the positioning of a workpiece in only one of said gauges for automatically connecting the pickup of said gauge to said amplifier when a workpiece is engaged by said gauge and for disconnecting all other gauges from said amplifier.

8. In a gauging apparatus, a plurality of separate gauges each embodying an electrical pickup element, a single amplifier adapted to amplify the output of said pickup, an indicating device associated with the amplifier and adapted to indicate a dimension of a workpiece engaged successively by said gauges, and electrical connections for automatically connecting the pickup of only one of said gauges to said amplifier when a workpiece is engaged by said gauge and for disconnecting all other gauges from said amplifier.

9. In a gauging apparatus, a plurality of separate gauges each embodying an electrical pickup element, an indicating device adapted to indicate a dimension of a workpiece engaged successively by said gauges, and electrical connections for automatically connecting the pickup of only one of said gauges to said indicating device when a workpiece is engaged by said gauge and for disconnecting all other gauges from said indicating device.

10. In a gauging apparatus, a plurality of separate gauges, a single electrical indicating device adapted to indicate a dimension of a workpiece engaged successively by said gauges, and electrical connections for automatically connecting only one of said gauges to said indicating device when a workpiece is engaged by said gauge and for disconnecting all other gauges from said indicating device.

References Cited in the file of this patent

UNITED STATES PATENTS

| | | |
|---|---|---|
| 1,765,538 | Nelson | June 24, 1930 |
| 1,851,152 | Brown | Mar. 29, 1932 |
| 2,018,399 | Engst et al. | Oct. 22, 1935 |
| 2,417,062 | Coake | Mar. 11, 1947 |
| 2,508,051 | Warren et al. | May 16, 1950 |
| 2,508,370 | Bozoian | May 23, 1950 |
| 2,553,129 | Burnett | May 15, 1951 |
| 2,569,433 | Highberg et al. | Sept. 25, 1951 |
| 2,583,791 | Neff | Jan. 29, 1952 |
| 2,617,197 | Derby | Nov. 11, 1952 |

FOREIGN PATENTS

| | | |
|---|---|---|
| 269,503 | Germany | Feb. 20, 1923 |